Jan. 24, 1956 J. I. ADLER, JR Re. 24,114

ARTIFICIAL FOLIAGE AND METHOD OF MAKING SAME

Original Filed Feb. 23, 1954

Inventor
Joseph I. Adler Jr.
By Silverman & Mullin
attorneys

United States Patent Office

Re. 24,114

Reissued Jan. 24, 1956

24,114

ARTIFICIAL FOLIAGE AND METHOD OF MAKING SAME

Joseph I. Adler, Jr., Chicago, Ill.

Original No. 2,716,828, dated September 6, 1955, Serial No. 411,731, February 23, 1954. Application for reissue November 21, 1955, Serial No. 548,296

5 Claims. (Cl. 41—13)

Matter enclosed in heavy brackets [ ] appears in the original patent but forms no part of this reissue specification; matter printed in italics indicates the additions made by reissue.

This invention is particularly concerned with a novel construction for artificial foliage and method of making same.

Artificial foliage of various kinds is widely used both for display purposes in commercial establishments and for decorative purposes commercially and in the home. Heretofore, artificial foliage has been made either from cloth, paper or plastic sheeting which has been preformed to a suitable configuration simulating natural foliage. The foliage may have a coating thereon of a suitable agent, such as shellac, to attain a high gloss. In some instances such foliage has been imprinted or embossed with designs simulating the veins of natural foliage and suitably colored to simulate a particular type or leaf, if desired. Artificial foliage of the prior art is attractive and displays of such foliage are well known to be relatively expensive and in most cases, even more expensive than the natural counterparts.

However, these prior art structures all possess many common disadvantages, one of the principal ones of which is inflammability. Especially in the case of the cloth or paper variety, substantially instantaneous consumption could be expected once the foliage became ignited. Great care has to be exercised as to the location at which the foliage is placed and constant care must be taken to prevent same from catching fire. Other disadvantages include the failure more closely to replicate natural foliage, and particularly in the different degree of flexibility, texture, and color which natural foliage is found to possess. Artificial foliage of the prior art also fades after extended periods of exposure to sunlight or electric lights and in some instances has been known to shrivel at the edges when exposed to room heat. Even with all of these recognized disadvantages, such artificial foliage continues to be expensive.

Accordingly, it is a principal object of the invention to provide artificial foliage of the character described and a novel method of making same which will eliminate completely the fire hazards attendant upon prior art structures and substantially eliminate all of the other disadvantages above enumerated.

Another *important* object of the invention is to provide artificial foliage and method of making same as hereinafter described which will greatly reduce the cost of artificial foliage displays to the public.

Another object of the invention is to provide a novel and unique method for making artificial foliage of the character described which may be carried out with marked simplicity, ease and rapidity, which method does not require highly expensive or complicated equipment and which is especially adapted to mass production techniques.

Other important objects of the invention are to provide artificial foliage of the character described comparing more favorably in appearance, texture and flexibility with natural foliage than heretofore has been possible, and which does not fade or shrivel after extended periods of use.

Another object of the invention is to provide artificial foliage of the character described and a novel method of making the same in which the foliage comprises a preformed member formed from cloth, paper or plastic and coated with a plastisol composition which, to the best of applicant's knowlege and belief, has never before been used in the manufacture of artificial foliage and by reason of which the distinctive advantages of this invention are attained.

These and other objects of the invention will become apparent as the description thereof evolves, a preferred embodiment of the structure and method of making same being more fully described and shown in the specification and accompanying drawings and more particularly pointed out in the appended claims. Minor variations in the structural features of the foliage and in the various steps of the method of making same are contemplated without departing from the spirit or scope of the invention.

Figure 1:
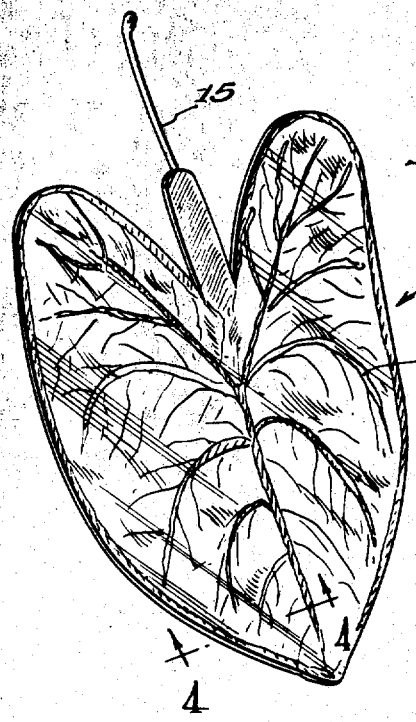
Fig. 1 is a perspective view of an artificial leaf constructed in accordance with the invention.
Figure 3:
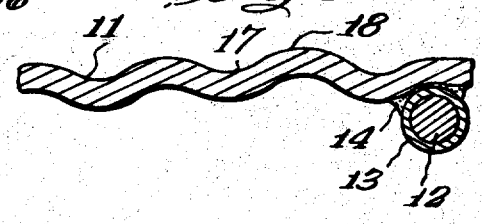
Fig. 3 is a fragmentary sectional view taken through the preformed member prior to being coated and greatly enlarged to show details thereof.
Figure 4:
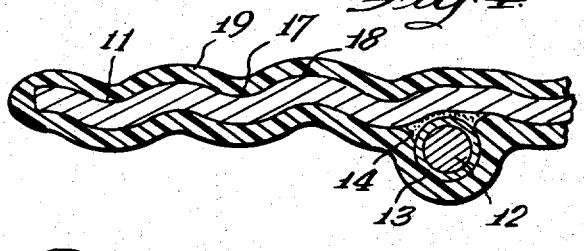
Fig. 4 is an enlarged sectional view taken through the said leaf along the line 4—4 of Fig. 1 and in the direction indicated.

The reference character 10 designates generally an artificial leaf constructed in accordance with the invention. The configuration shown in Fig. 1 is strictly for illustrative purposes, it being understood that the foliage embodying the invention may be formed in any desired shape, size and form. Same comprises a pre-formed carrier blank, a portion 11 of said blank being shown in Fig. 3. The blank 11 may be formed from cloth, paper or plastic, but it is preferred that such material be substantially nonporous for reasons explained subsequently herein. To one surface of said blank 11, at the approximate center thereof and longitudinally thereon is secured a wire strand 12 which has been wrapped with thread 13 and held on the blank 11 by means of a suitable adhesive 14. As shown in Fig. 1, the strand 12 may have a portion 15 extending outwardly of the leaf to provide means for assembling the leaf in a foliage display.

The member 11 may have imprinted or embossed thereon a design 16 in the form of lines and shading simulating the veins and surfaces of a natural leaf. If required, the member 11 may have been colored to approximate the color of a natural leaf sought to be replicated. Where imprinted or embossed, it will be found that the surfaces of the member 11 will have become irregular to provide troughs 17 and peaks 18 thereon as greatly exaggerated in Fig. 3. Of course, the member 11 may also be formed with smooth surfaces, however, it is believed that the irregular formation more closely approximates its natural counterpart.

A uniform coating 19 of a synthetic plastic composition is affixed over said member 11 completely covering same, the wire strand 12 and portion 15 thereof. The coating 19 consists of a plastisol composition applied thinly on the member 11, including, of course, the troughs 17 and peaks 18 and solidified thereon. The coating 19 is transparent enabling the design 16 to be readily visible therethrough and is flexible to a degree enabling the leaf 10 very closely to replicate the texture, appearance and flexibility of a natural leaf. Of prime importance is that the coating 19 is flame-proof and resists deterioration and also, prevents shrivelling of the edges of the leaf 10.

Even after long periods of exposure to sunlight or artificial light, the color of member 11 and design 16 does not fade so that the leaf 10 maintains its beautiful and attractive appearance.

Figure 2:
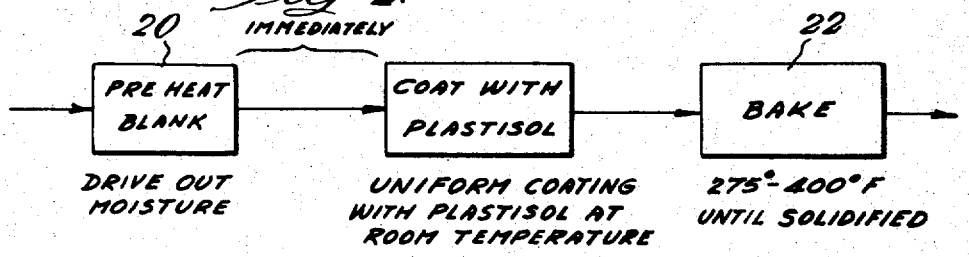
Fig. 2 is a flow diagram illustrating the novel method of making said leaf in accordance with the invention.

We now consider the novel method of making the leaf 10, reference being had to Fig. 2 wherein a simplified flow diagram of the method is shown. The method is particularly suitable for mass production techniques and hence the various steps may be carried out on an assembly line including a conveyor belt system or turntable arrangement at suitable points thereon. The first step is to preform the blank member 11 and attach the strand 12. The member 11 may have been first imprinted or embossed with the design 16. If desired, the member 11 may be purchased already pre-formed and with the strand 12 attached and hence this step does not comprise a part of the novel method of the invention.

The ensuing steps may then be carried out employing assembly-line procedure. The member 11 is passed into a heating chamber 20, for instance, by placing same on a conveyor belt or turntable, and pre-heated slowly to drive off any moisture captured in the member. The optimum temperature at which the pre-heating is conducted is relatively unimportant, it being necessary only to drive off captured moisture without charring the member 11. The pre-heating chamber may have heat lamps or filaments suitably arranged for heating the member 11 which is passing along a conveyor belt or turntable.

After pre-heating, the member 11 is removed from the chamber 20 and immediately coated with the plastisol composition. The interim between removal from the chamber 20 and coating must be at a minimum so as to reduce absorption of water due to cooling of the hot member 11. A uniform, thin coating of the plastisol is applied either manually such as by rubbing the coating on or by first dipping same into the plastisol and thereafter spreading or squeezing the coating on. Other well known procedures may also be employed. It is desirable that the coating be relatively thin since the thicker the coating, the less degree of transparency attained therefor.

It is important to realize that the plastisol composition is quite viscous, such that dipping, while possible, is none the less impractical. Greatest success has been achieved by simply smearing the plastisol on by hand. Procedures which achieve the same functions as this manual step are obviously within the scope of the invention. This would include calendaring, squeezing, etc.

After the coating 19 has been applied, the blank 11 is racked and passed into a second heating chamber 22. The leaf is baked in chamber 22 at a temperature of from 275 to 400 degrees Fahrenheit until the coating 19 solidifies. I have found that for satisfactory results at a minimum time in chamber 22, the leaf may be baked at approximately 350 degrees Fahrenheit for from one to three minutes depending upon the thickness of the coating 19. Such a short period of baking enables speedy manufacturing and reduces the cost per leaf.

Pre-heating of the member 11 in chamber 20 and immediate coating thereof upon removal from said chamber is most important. I have found that where the blank is not pre-heated or done so properly and where the coating is not applied with minimum loss of time after removal of the member 11 from the chamber 20 results in bubbling or other unsightly eruptions on the coating 19 after it is baked in the chamber 22. I prefer also that the member 11 be formed from paper, cloth or plastic of substantially non-porous nature. This reduces the amount of moisture which may be entrapped therein and also prevents saturation of the member 11 by the plastisol. The coating 19 is therefore desired to be only on the surfaces of member 11 so as more uniformly to provide the desired thin, transparent coating of plastisol.

The plastisol composition which I employ enables manufacture of the leaf 10 with its attendant advantages. Not all commercially available plastisols have been found to be satisfactory because they fail to provide the high degree of transparency desired, speed with which my novel method may be carried out with mass production techniques and proper flexibility of the coating 19. An example of the plastisol composition which is employed in this invention is as follows:

| | Unit of weight |
|---|---|
| 100% polyvinyl chloride | 100.0 |
| Tri (2-ethylhexyl) phosphate | 26.0 |
| Dioctyl adepate | 14.7 |
| Dioctyl sebacate | 14.0 |
| Organic tin compound (stabilizer) | 3.0 |
| Aluminum stearate | 2.3 |

The effect of the coating of the invention is to produce artificial foliage which is smooth and water-proof, hence easy to clean. It is lustrous and flexible, giving a "live" appearance. Its transparency enables the colors to appear to come from the interior of the article, which makes the article even more life-like. The coating has no effect upon shape, causes no shrinkage or warping or change of color. The article is light in weight and the coating is not so thick as to render the article *clumsy* or misshapen in appearance.

It is believed that the invention has been described sufficiently to enable same to be comprehended and practiced as required by the patent statutes. It is desired to be limited in the scope of inventive achievement only as set forth in the claims hereto appended.

What is desired to be secured by Letters Patent of the United States is:

1. An artificial leaf comprising a flexible fabric sheet preformed to simulate the configuration of a natural leaf and having reproduced on each surface thereof a leaf design replicating color, veins and surface texture of a natural leaf, a stem-forming member secured to a surface of said sheet, said sheet having a coating of transparent, non-inflammable plastisol on said surfaces and encasing the stem member, said coating being thin and substantially uniform whereby light reflected from said artificial leaf appears to an observer to have originated from within said leaf in simulation of natural leaf effects.

2. An artificial leaf as described in claim 1 in which said coating is a vinyl resin plastisol characterized by its high degree of flexibility.

3. A method for making an artificial leaf comprising forming a flexible fabric sheet member to simulate the configuration of a natural leaf and reproducing on each surface of said sheet member a leaf design replicating color, veins and surface texture of a natural leaf, affixing a stem-forming member to a surface of said sheet member, pre-heating said sheet member, encasing said sheet member and stem-forming member in a flexible, uniformly thin [non-inflammable] plastisol envelope and then baking said leaf to solidify the plastisol into a flexible transparent envelope.

4. A method as described in claim 3 in which the time permitted to elapse between pre-heating and encasing of the sheet member is a minimum amount.

5. A method as described in claim 3 in which said envelope is formed by applying a thin coat of said vinyl resin plastisol to each surface of the sheet member and over the stem member.

References Cited in the file of this patent or the original patent

UNITED STATES PATENTS

| | | |
|---|---|---|
| 254,105 | Bedford | Feb. 28, 1882 |
| 1,611,713 | Bentkamp | Dec. 21, 1926 |
| 1,831,713 | Ham et al. | Nov. 10, 1931 |
| 2,306,835 | Tucker et al. | Dec. 29, 1942 |
| 2,486,259 | Chevannes | Oct. 25, 1949 |

OTHER REFERENCES

Vinyl Plants, Modern Plastics, June 1921, page 94.